US008763766B2

(12) United States Patent
Ebner et al.

(10) Patent No.: US 8,763,766 B2
(45) Date of Patent: Jul. 1, 2014

(54) PLUNGER ROD ADJUSTER FOR COMPACT BRAKE CALIPER UNITS, HAVING A SCREW CONNECTION ELEMENT SUPPORTED DIRECTLY ON THE ADJUSTER HOUSING

(75) Inventors: Christian Ebner, Augsburg (DE); Erich Fuderer, Fürstenfeldbruck (DE); André Stegmann, Eichenau (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 99 days.

(21) Appl. No.: 13/576,697

(22) PCT Filed: Jan. 27, 2011

(86) PCT No.: PCT/EP2011/051098
§ 371 (c)(1),
(2), (4) Date: Aug. 10, 2012

(87) PCT Pub. No.: WO2011/095423
PCT Pub. Date: Aug. 11, 2011

(65) Prior Publication Data
US 2012/0292138 A1    Nov. 22, 2012

(30) Foreign Application Priority Data
Feb. 2, 2010   (DE) .......................... 10 2010 006 709

(51) Int. Cl.
*F16D 65/40*    (2006.01)

(52) U.S. Cl.
USPC .................... 188/72.9; 188/196 F; 188/196 D

(58) Field of Classification Search
USPC ............ 188/71.9, 72.7–72.9, 196 B, 196 BA, 188/196 D, 196 R, 196 V, 202
See application file for complete search history.

(56) References Cited

U.S. PATENT DOCUMENTS 4,018,140 A * 4/1977 Engle ................................. 92/31
5,501,305 A * 3/1996 Stalmeir et al. ............... 188/167
(Continued)

FOREIGN PATENT DOCUMENTS

| DE | 10214670 A1 | 10/2003 |
| EP | 0699846 A2 | 3/1996 |
| EP | 0732247 A2 | 9/1996 |

OTHER PUBLICATIONS

Notification Concerning Transmittal of International Preliminary Report on Patentability and Written Opinion of the International Search Authority for International Patent Application No. PCT/EP2010/051098, dated Jan. 27, 2011.
English Translation of Notification Concerning Transmittal of International Preliminary Report on Patentability and Written Opinion of the International Search Authority for International Patent Application No. PCT/EP2010/051098, dated Jan. 27, 2011.
(Continued)

*Primary Examiner* — Christopher Schwartz
(74) *Attorney, Agent, or Firm* — Barnes & Thornburg LLP

(57) ABSTRACT

A wear adjuster for a brake caliper of a disk brake of a rail vehicle, having a) a helical gearing which has a threaded spindle and a nut to be screwed thereon as the screw connection elements, one of the screw connection elements and an adjusting element being rotatable in a first wear adjuster housing to rotatingly drive the screw connection element in the wear adjusting direction and the other screw connection element being non-rotatably mounted in a second wear adjuster housing, b) a wrap spring freewheeling mechanism which is blocked in a direction of rotation of the rotatable screw connection element against a wear adjustment and which is freewheeling in the opposite direction of rotation, the wrap spring freewheeling mechanism coupling the rotatable screw connection element to a rotationally fixed element. The rotationally fixed element is formed directly by the first wear adjuster housing.

11 Claims, 5 Drawing Sheets

(56) References Cited

U.S. PATENT DOCUMENTS

| | | | |
|---|---|---|---|
| 5,813,499 A * | 9/1998 | Staltmeir et al. | 188/59 |
| 6,722,477 B1 * | 4/2004 | Wolfsteiner et al. | 188/72.9 |
| 6,957,571 B2 * | 10/2005 | Staltmeir et al. | 73/121 |
| 7,413,061 B2 * | 8/2008 | Wagner et al. | 188/72.9 |
| 7,438,163 B2 * | 10/2008 | Fuderer et al. | 188/196 V |
| 2004/0074709 A1 * | 4/2004 | Krug et al. | 188/72.1 |

OTHER PUBLICATIONS

Search Report for International Patent Application No. PCT/EP2011/051098; Jul. 26, 2011.

* cited by examiner

PLUNGER ROD ADJUSTER FOR COMPACT BRAKE CALIPER UNITS, HAVING A SCREW CONNECTION ELEMENT SUPPORTED DIRECTLY ON THE ADJUSTER HOUSING

PRIORITY CLAIM

This patent application is a U.S. National Phase of International Patent Application No. PCT/EP2011/051098, filed 27 Jan. 2011, which claims priority to German Patent Application No. 10 2010 006 709.1, filed 2 Feb. 2010, the disclosures of which are incorporated herein by reference in their entirety.

FIELD

The invention relates to a wear adjuster for a brake caliper of a disk brake of a rail vehicle, having a helical gearing, which has, as screw connection parts, a threaded spindle and a nut which can be screwed thereon, wherein one of the screw connection parts and an actuator element for rotatably driving the screw connection part in a wear adjustment direction can be rotated in a first wear adjuster housing, and the other screw connection part is mounted in a rotationally fixed fashion in a second wear adjuster housing, and also having a wrap spring freewheeling mechanism, which blocks in the direction of rotation of the rotatable screw connection part counter to a wear adjustment and freewheels in the opposite direction of rotation, it being possible to couple the rotatable screw connection part to a rotationally fixed part by the wrap spring freewheeling mechanism.

BACKGROUND

In compact brake caliper units of rail vehicles, the wear of the brake linings and of the brake disk is compensated automatically by lengthening or shortening a push rod or pull rod adjuster. The lengthening or shortening of the actuator is carried out by a helical gearing as a nut-spindle system. To achieve the greatest possible adjustment per activation, the thread is embodied with a very large pitch. The thread is therefore not self-locking. While the one helical gear element, for example the nut, is secured in a rotationally fixed fashion, the other helical gear element, for example the spindle, is rotatably mounted.

An actuation mechanism enables an actuator lever with a freewheeling mechanism (for example sleeve freewheeling mechanism) to be rotated, which actuator lever in turn drives or rotates the spindle or the nut of the push rod adjuster in such a way that the actuator in the case of a push rod adjuster is, for example, lengthened. For the purpose of adjustment, the actuator lever is therefore activated by a push rod with a spherical head, which push rod engages in a dome of the actuator lever. The spindle is rotated along by the sleeve freewheeling mechanism which is pressed into the actuator lever. In this context, a wrap spring freewheeling mechanism slips through in the freewheeling direction. If the push rod releases the actuator lever again when the brake is released, the actuator lever is rotated back again into its home position by a restoring spring, in which home position the actuator lever abuts against a rigid stop of the adjustor housing. The sleeve freewheeling mechanism rotates here in a freewheeling direction, and in the process the spindle is prevented from rotating along by the wrap spring of the wrap spring freewheeling mechanism. The adjustment process is ended when the actuator lever abuts against a stop in the adjustor housing or when an axial force which can no longer be overcome by the actuation mechanism of the actuator builds up in the actuator, for example when the linings come to bear on the brake disk.

In the case of a push rod adjuster, a rotation, for example, of the spindle of the spindle-nut gear mechanism in the direction which shortens the push rod adjuster is prevented by a wrap spring freewheeling mechanism between the spindle and the adjustor housing. This wrap spring freewheeling mechanism forms, in addition to the freewheeling mechanism of the actuator element, a further or second freewheeling mechanism. As a result of the wrap spring freewheeling mechanism, the rotatable spindle is held in its position when the actuator element is rotated back into its home position by the force of its restoring spring and/or if a large brake application force acts on the actuator, and therefore a large torque acts on the spindle, during a braking operation.

EP 0 732 247 B1 describes a push rod adjuster of a brake caliper of a disk brake of a rail vehicle in which, according to FIG. 3, the nut is secured in a rotationally fixed fashion in the right-hand wear adjuster housing (reference number 22) and the spindle is rotatably mounted in a guide tube which is connected to the left-hand wear adjuster housing (reference number 21). Furthermore, there is a wrap spring freewheeling mechanism which blocks in the direction of rotation of the spindle counter to a wear adjustment and freewheels in the opposite direction of rotation, it being possible to couple the spindle, by the wrap spring freewheeling mechanism, to the separate guide tube which is secured to the left-hand wear adjuster housing. A wrap spring of the wrap spring freewheeling mechanism is enclosed radially here by the left-hand wear adjuster housing which also accommodates the actuator lever (reference number 24) and the sleeve freewheeling mechanism.

The axial force which loads the push rod adjuster when the brakes are activated, and which attempts to shorten the push rod actuator is supported in the force flux from the rotationally fixed nut, and the threaded spindle is supported by the actuator lever in the left-hand wear adjuster housing. As a result, the actuating accuracy of the wear adjuster is influenced not only by the thread friction of the helical gearing but also by the frictional conditions between the actuator lever and the left-hand wear adjuster housing or between the actuator lever and the threaded spindle.

EP 0 699 846 B1 describes a disk brake for rail vehicles have a brake caliper and an automatic wear adjuster. In the embodiment as a push rod actuator which is described in the document, the actuator lever is formed by an actuator sleeve with outer toothing. A sleeve freewheeling mechanism is pressed into this actuator sleeve. A gearwheel segment, by which the actuator sleeve can be rotated counter to the force of a restoring spring by a lever, is in engagement with the toothing of the actuator sleeve. The nut is entrained by the sleeve freewheeling mechanism, as a result of which the push rod adjuster is lengthened. According to FIG. 2, the spindle is mounted here in a rotationally fixed fashion in the left-hand wear adjustor housing, and the nut is mounted in a rotatable fashion in the right-hand wear adjuster housing. By a wrap spring of a wrap spring freewheeling mechanism, the rotatable nut can be secured to a radially inner tube part (reference number 29), which is connected to the right-hand wear adjuster housing. Furthermore, a tube-like housing part (reference number 30) of the right-hand wear adjuster housing encloses the wrap spring freewheeling mechanism.

In the described push rod adjusters of the prior art, in each case at least one wear adjuster housing is constructed in multiple parts and, in particular, in the manner of a double tube by virtue of the fact that the wrap spring of the wrap spring freewheeling mechanism interacts with a separate tube, which is connected to the respective wear adjuster housing, and, on the other hand, the wrap spring freewheeling mechanism is respectively radially enclosed by a tube-like projection of this wear adjuster housing. However, the construction of such a double-tube-like wear adjuster housing entails certain costs for the manufacture and assembly or disassembly for repair purposes.

Furthermore, the space required for connecting the separate tubes to the respective wear adjuster housing reduces the installation space for the wrap spring freewheeling mechanism, for which reason the wrap spring in the described prior art has to be secured to the rotationally fixed and separate tube by a hook. However, such a hook has an unfavorable effect on the switching accuracy of the wrap spring freewheeling mechanism and therefore on the actuating accuracy of the wear adjuster. Furthermore, a separate step for manufacturing the hook is also necessary during fabrication.

SUMMARY

Disclosed embodiments provide a wear adjuster of the above-mentioned type in such a way that the wear adjuster is easier to manufacture and at the same time has greater actuating accuracy.

BRIEF DESCRIPTION OF THE FIGURES

Exemplary embodiments of the invention are illustrated below in the drawing and explained in more detail in the following description. In the drawing.

DETAILED DESCRIPTION OF THE DISCLOSED EMBODIMENTS

Figure 1:
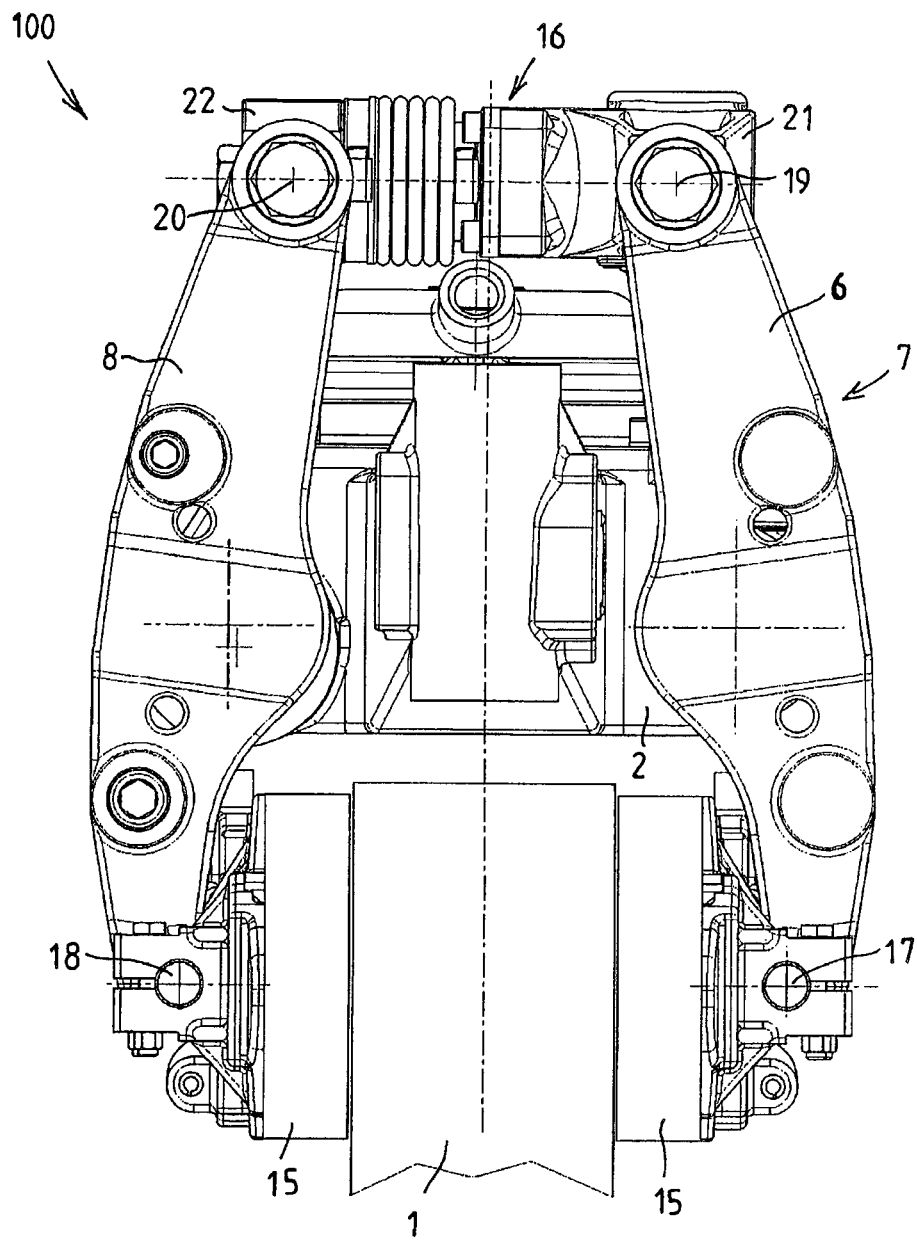
FIG. 1 shows a plan view of a disk brake of a rail vehicle, having a push rod adjuster of a brake caliper as a wear adjuster according to one preferred embodiment of the invention.

In accordance with disclosed embodiments, the rotationally fixed part is formed directly by the first wear adjuster housing. The term "directly" is to be understood here as meaning that the rotatable screw connection part can be supported on the first wear adjuster housing directly, i.e., without intermediate arrangement of further elements such as, for example, tubes, by the wrap spring freewheeling mechanism or the wrap spring. In this sense, the first wear adjuster housing is, for example, embodied in one piece, wherein attached to the housing there are no elements such as projections or tubes which are embodied as separate elements and which are located in the force flux when the wear adjuster has to support an axial force which loads it in the shortening direction.

A "first" wear adjuster housing is intended to be understood as meaning the housing part of the wear adjuster which is coupled to the one caliper lever of the brake caliper, and the "second" wear adjuster housing is to be understood as meaning the housing part which is coupled to the other caliper lever. In the terminology of the specialist field, "housing" is also customary for the first wear adjuster housing, and "yoke" for the second wear adjuster housing.

As a result, the double-tube-like embodiment of the first wear adjuster housing of the prior art can be dispensed with, in particular any separate guide tubes which are attached to the first wear adjuster housing can be dispensed with, as a result of which the number of components of the wear adjuster and therefore the fabrication costs and assembly costs are advantageously reduced.

Furthermore, the wrap spring of the wrap spring freewheeling mechanism then engages, on the one hand, on the active face of the rotatable screw connection part and, on the other hand, on an active face which now forms an outer face of the first wear adjuster housing, to prevent the rotatable screw connection part from rotating as a result of frictional locking or frictionally locking coupling to the rotationally fixed screw connection part, and no longer on an active face of a separate tube which is arranged in the interior of the first wear adjuster housing. As a result, more favorable space conditions are produced. In particular, there is then more installation space for the wrap spring of the wrap spring freewheeling mechanism, as a result of which the longitudinal extent thereof can be enlarged in the axial direction of the wear adjuster. Because more turns can then act on the active face of the first wear adjuster housing or of the rotationally fixed screw connection part then, the frictionally locking engagement of the wrap spring freewheeling mechanism and therefore the transmission of force are improved. Consequently, it is possible to dispense with a hook for attaching the wrap spring. This measure has in turn a positive effect on the switching accuracy of the wrap spring freewheeling mechanism and therefore on the actuating accuracy of the wear adjuster. In this case, the transmission of force at the wrap spring freewheeling mechanism can take place exclusively through frictionally locking engagement between the turns of the wrap spring and the assigned active faces on the first wear adjuster housing and the rotatable screw connection part.

A wrap spring of the wrap spring freewheeling mechanism particularly preferably interacts in a frictionally locking fashion, on the one hand, with a radially outer active face, which forms an outer surface of the first wear adjuster housing, and on the other hand, with a radially outer active face of the rotatable screw connection part or an element which rotates along therewith. In other words, the active face for the wrap spring already forms part of the outer surface of the first wear adjuster housing without the wrap spring being enclosed by further tubes or housing sections. An "active face" is to be understood here as meaning the face of the respective component on which turns of the wrap spring engage from the radially outer direction, to bring about frictionally locking engagement between the wrap spring and the respective component.

To protect the helical gearing, the wrap spring freewheeling mechanism and further components of the wear adjuster against soiling and moisture, for example in a hermetically sealed fashion, the wrap spring of the wrap spring freewheeling mechanism is, when viewed in the radial direction, enclosed exclusively by a folding bellows which is elastic in the axial direction of the wear adjuster and is secured at one end to the first wear adjuster housing and at the other end to the second wear adjuster housing. The wrap spring freewheeling mechanism and the wrap spring are, when viewed in the axial direction, preferably then arranged between the two coupling points of the folding bellows on the wear adjuster housings.

Given a suitable minimum length of the wrap spring which is made possible by the measures according to the invention, the wrap spring can then couple the active face of the first wear adjuster housing and the active face of the rotatable screw connection part, or of the element which rotates along therewith, exclusively by frictionally locking engagement while dispensing with a positively locking hook. As already explained above, dispensing with a hook on the wrap spring has a positive effect on the switching accuracy of the wrap spring freewheeling mechanism and therefore on the actuating accuracy of the wear adjuster. In particular, this permits wear of the active faces or of the wrap spring to be avoided because tilting of the wrap spring with locally large stress peaks cannot occur owing to the then free movement of the wrap spring in the axial direction.

According to one development, the rotatable screw connection part or an element which rotates along therewith has an end face which points in the axial direction and which makes contact with a corresponding end face of the first wear adjuster housing in order to support an axial force acting on the wear adjuster. In this case, the axial force flux therefore runs directly into the first wear adjuster housing from, for example, the second wear adjuster housing via the screw connection part held there in a rotationally fixed fashion and via the screw connection part which is screwed thereto, is rotatable per se and which is prevented from rotating by the wrap spring freewheeling mechanism, via the two end faces which are in contact with one another. Consequently, a compressive force which acts on the wear adjuster and is applied via the caliper lever is applied to the first wear adjuster housing directly and without a detour via the actuator lever, as is the case, for example, in EP 0 732 247 B1, with the result that the frictional conditions of the actuator lever can no longer influence the actuating accuracy. In particular, this force flux closes the joint under the wrap spring freewheeling mechanism.

The rotatable screw connection part preferably forms the threaded spindle, and the rotationally fixed screw connection part of the helical gearing preferably forms the nut. A coupling sleeve can then be coupled to the threaded spindle as an element which rotates along and on whose radially outer circumferential face an active face for the wrap spring of the wrap spring freewheeling mechanism to engage on is formed. This coupling sleeve is then rotatably mounted, for example, in the first wear adjuster housing. The coupling sleeve is necessary because the threaded spindle is arranged within the nut the wrap spring is arranged radially on the outside, with the result that the rotational movement of the threaded spindle has to be transmitted radially outward.

According to one alternative, the rotatable screw connection part is formed by the nut and the rotationally fixed screw connection part is formed by the threaded spindle. For example, the active face for the wrap spring of the wrap spring freewheeling mechanism to engage on is then formed directly on a radially outer circumferential face of the nut because the nut is in any case arranged radially on the outside.

The invention includes, in particular, also disk brakes of rail vehicles which include a wear adjuster as described above.

Figure 2:
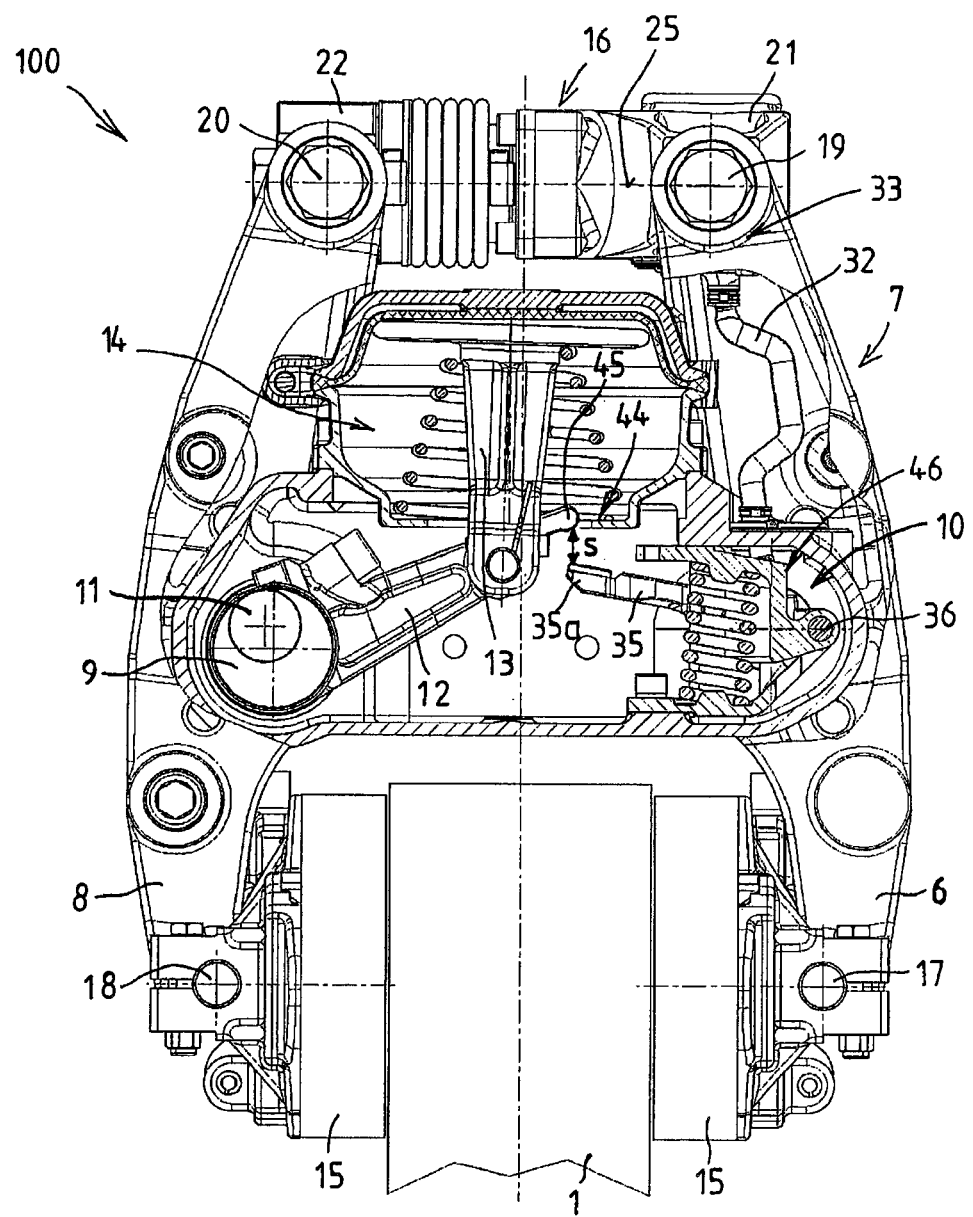
FIG. 2 shows a partially cut-away, view of the brake caliper in FIG. 1.

FIG. 1 and FIG. 2 show a disk brake 100 for, in particular, laterally displaceable wheel sets of rail vehicles, having a brake caliper 7 which is driven eccentrically and whose two caliper levers 6, 8 are coupled at their one end to brake shoes 15 and in their central regions to a brake force motor 14. The brake disk 1 is only partially illustrated as an axial disk.

The two cheeks of a double-cheek caliper lever 6 of a brake caliper 7 are coupled to a brake housing 2 so as to be rotatable about a rotational axis by means of bolts 9, at a coupling point 10 which can be considered as secured in a spatially fixed fashion. The caliper lever 8 on the other side is rotatably coupled to the brake housing 2 by a bolt 9 at a coupling point 10, which bolt 9 is mounted here on the brake housing 2 so as to be rotatable about a rotational axis which is parallel to the rotational axis, and the bolt 9 has eccentrically axis-parallel bolt projections 11 on which the caliper lever 8 is mounted.

A rotating arm 12, to whose end the piston rod of a brake cylinder is coupled as a force outputting element 13 of a brake force motor 14, projects from the bolt 9. The two caliper levers 6 and 8 are rotatably coupled at their one end to brake shoes 15, which can be pressed against the brake disk 1, and at their other end to a wear adjuster 16 which connects them, in the exemplary embodiment a push rod adjuster, at coupling points 17, 18, 19 and 20. The push rod adjuster 16 or its adjustor housing is provided, for coupling it, with bearing parts 21 and 22 which each extend between the two cheeks 4 and 5 of the caliper levers 6 and 8. These bearing parts are also referred to below as first and second wear adjuster housings 21, 22.

When pressure medium is applied to, for example, the pneumatic brake force motor 14, the force outputting element 13 thereof rotates the rotating lever 12, as a result of which the caliper lever 8 is rotated, by virtue of the eccentric arrangement of the bolt projections 11, about its coupling point 12 to the push rod adjuster 16 in the contact pressure direction of its brake shoe 15 against the brake disk 1. The design and the method of functioning of the eccentric brake application of the brake caliper 7 therefore correspond to those according to the already mentioned EP 0 732 247 A2. After the brake shoe 15, assigned to the caliper lever 8, comes to bear against the brake disk 1, the caliper lever 8 rotates about its coupling point 18 to this brake shoe 15, wherein the caliper lever 6 is rotated about the coupling point 10 via the coupling point 20, the rod 16 and the coupling point 19, in order to apply its brake shoe 15 against the brake disk 1.

The push rod adjuster 16 increases its length in accordance with the wear of the brake shoes 15. For this purpose, the push rod adjuster 16 has an actuator lever 24 which is mounted, so as to be rotatable about a longitudinal axis 25 of the push rod adjuster 16, on the first wear adjuster housing 21 assigned to the caliper lever 6. A pin-shaped stop section 23 of the actuator lever 24 is forced into its home position, and against a stop 37 illustrated in FIGS. 3 to 8, by a restoring spring 26 which is supported against the first wear adjuster housing 21.

Figure 3:
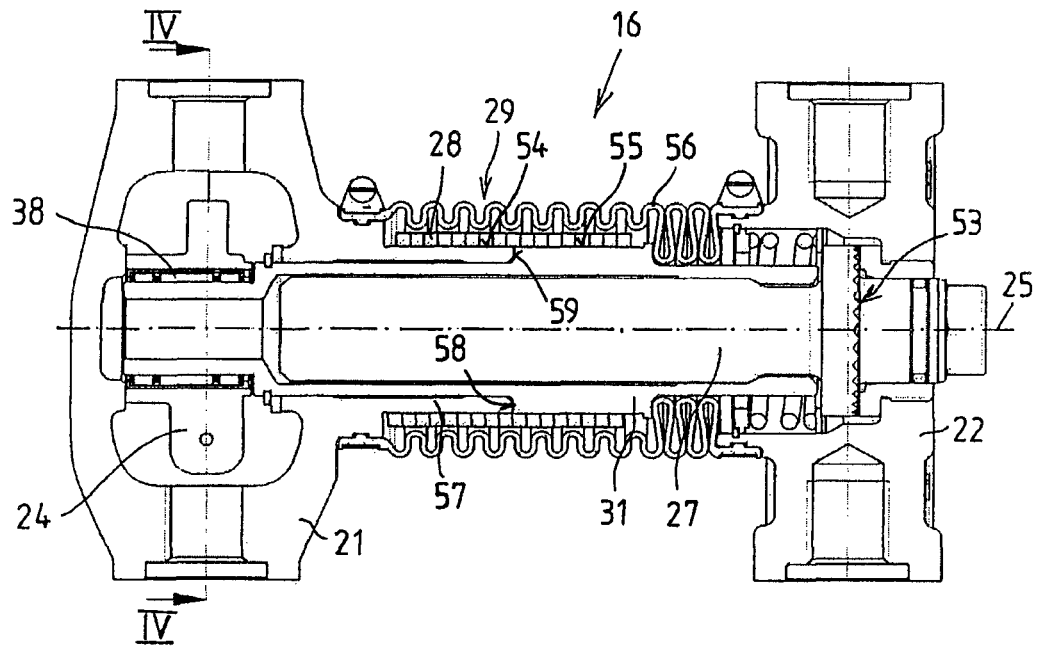
FIG. 3 shows a cross-sectional illustration of the push rod adjuster of the disk brake in FIG. 1.

As is apparent from FIG. 3, an extending threaded spindle 27, which is secured against rotation by a prestressed toothing 53, is held in a rotationally fixed fashion coaxially with respect to the longitudinal axis 25 and in an axially undisplaceable fashion in the second wear adjuster housing 22. In contrast, an actuator nut 31 which is screwed to the threaded spindle 27 is rotatably mounted on the first wear adjuster housing 21. The threaded spindle 27 and the actuator nut together form a helical gearing of the push rod adjuster 16.

The actuator nut 31 can be coupled in a rotationally fixed fashion to the first wear adjuster housing 21 via a one-way rotational coupling equipped with a wrap spring 28 or a wrap spring freewheeling mechanism 29. On the other hand, the actuator nut 31 is driven in the lengthening direction of the push rod adjuster 16 by the actuator lever 24 via the sleeve freewheeling mechanism 38. The basic design and the method of functioning of such wear adjusters with helical gearing and two one-way rotational couplings or freewheeling mechanisms are generally known and therefore do not need to be described in all their details. However, it is also possible to use other designs of wear adjusters, for example pull rod adjusters; all that is essential here is, inter alia, that the wear adjuster has an actuator element which corresponds to the actuator lever 24.

In the illustrated embodiment according to FIG. 3, the threaded spindle 27 is mounted in a rotationally fixed fashion in the second wear adjuster housing 22 and the actuator nut 31 is, in contrast, rotatably mounted in the first wear adjuster housing 21. The tube nut 31 can be rotated by the actuator lever 24 with sleeve freewheeling mechanism 38 in a direction in which the push rod adjuster 16 is lengthened to adjust the wear. However, an embodiment is also conceivable, for example according to EP 0 732 247 A2, in which the threaded spindle 27 is rotatably driven by the actuator lever 24, and the actuator nut 31 is mounted in a rotationally fixed fashion, as will also be described later in accordance with the embodiment in FIG. 10.

The wrap spring 28 supports the torque, arising from an axial force acting on the push rod adjuster 16, of the actuator nut 31 which is then prevented from rotating, directly on a radially outer active face 54 of the first wear adjuster housing 21, which active face 54 forms at the same time an outer surface of the first wear adjuster housing 21. The radially outer active face 54 is preferably formed here on a tube-shaped projection 57 which is, however, in one piece with the first wear adjuster housing 21.

The actuator nut 31 which is preferably rotatable in FIG. 3 also has an active face 55 for the wrap spring 28, i.e. turns of the wrap spring 28 can act on the active face 55, the further turns of which wrap spring 28 act on the active face 54 of the first wear adjuster housing 21 to prevent, through a reduction in the diameter of the wrap spring 28, a rotation of the actuator nut 31 and therefore shortening of the push rod adjuster 16 in the case of loading by axial force. The wrap spring 28 of the wrap spring freewheeling mechanism then couples the active face 54 of the first wear adjuster housing 21 and the active face of the actuator nut 31 exclusively by frictionally locking engagement, while dispensing with positively locking means such as, for example, a hook.

To protect the helical gearing 27, 31, the wrap spring freewheeling mechanism 29 and further components against soiling and moisture, the wrap spring 28 of the wrap spring freewheeling mechanism 29 is, when viewed in the radial direction, enclosed exclusively by a folding bellows 56 which is elastic in the axial direction of the push rod adjuster 16 and is secured at one end to the first wear adjuster housing 21 and at the other end to the second wear adjuster housing 22, for example by clamping rings.

The actuator nut 31 has an end face 58 which points in the axial direction and which makes contact with a corresponding end face 59 of the first wear adjuster housing 21 to support an axial force acting on the push rod adjuster 16. The axial force flux therefore runs, for example, from the second wear adjuster housing 22 directly and immediately into the first wear adjuster housing 21 via the threaded spindle 27, held there in a rotationally fixed fashion, and the actuator nut 31 which is screwed to the threaded spindle 27 and prevented from rotating by the wrap spring freewheeling mechanism 29, via the two end faces 58, 59 which are in contact.

Figure 9:
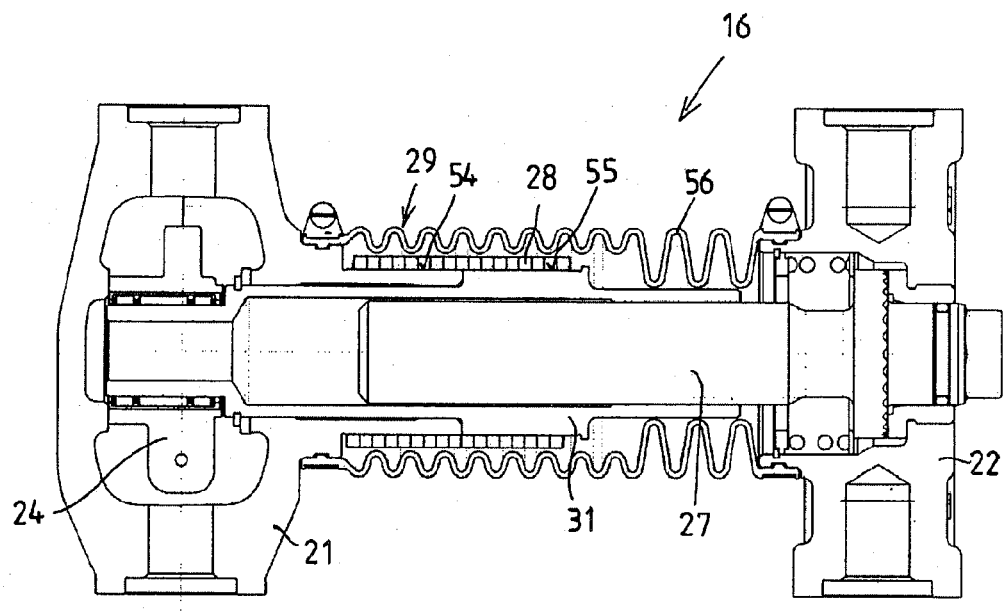
FIG. 9 shows a cross-sectional illustration of the push rod adjuster from FIG. 3 in a lengthened state.

FIG. 9 shows the push rod adjuster from FIG. 3 in a lengthened state, i.e. the actuator nut 31 has been driven by the actuator lever 21 in a rotational direction on the threaded spindle 27 which lengthens the push rod adjuster 16 to automatically adjust wear of the brake shoes 15. The wrap spring freewheeling mechanism 29 is freewheeling here, i.e. the turns of the wrap spring 28 are, through the enlargement of the diameter of the wrap spring 28, disengaged from the active faces 54 and 55, with the result that the actuator nut 31 can rotate freely in the wear adjustment direction. As is apparent, the folding bellows 56 has deformed elastically when the push rod adjuster 16 has lengthened, because the two wear adjuster housings 21, 22 have moved away from one another.

Figure 10:
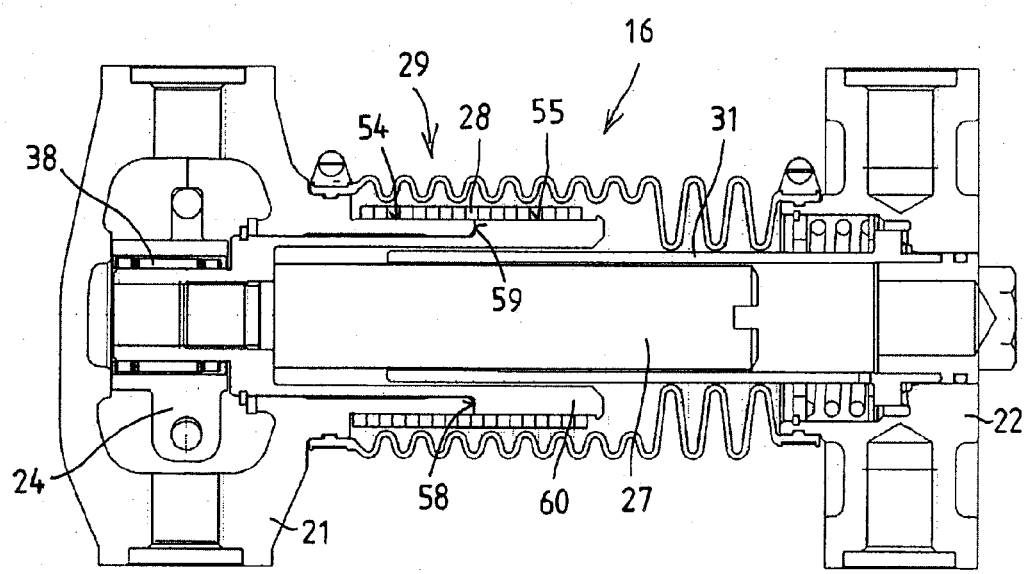
FIG. 10 shows a cross-sectional illustration of a further embodiment of a push rod adjuster.

FIG. 10 shows a further exemplary embodiment of a push rod adjuster 16 in which the rotatable screw connection part of the helical gearing is formed by the threaded spindle 27, and the rotationally fixed screw connection part of the helical gearing is formed by the actuator nut 31. A coupling sleeve 60 is then rotationally coupled, as an element which rotates along, to the threaded spindle 27, on the radially outer circumferential face of which coupling sleeve 60 an active face 55 for the wrap spring 28 of the wrap spring freewheeling mechanism 29 to engage is formed. The coupling sleeve 60 is then rotatably mounted together with the threaded spindle 27 in, for example, the first wear adjuster housing 21, and the actuator nut 31 is held in a rotatably fixed fashion in the second wear adjuster housing 22. In this case, the coupling sleeve 60 encloses at least a section of the threaded spindle 27 which points to the first wear adjuster housing 21, wherein the coupling sleeve 60 is coupled to the actuator lever 24 by the sleeve freewheeling mechanism 38. An end face 58 of the coupling sleeve 60 is also supported on a corresponding end face 59 of the first wear adjuster housing 21 or the projection 57 thereof if the push rod adjuster 16 comes under axial load.

To perform wear adjustment, the actuator sleeve 24 then also drives the threaded spindle 27 via the sleeve freewheeling mechanism 38 and the coupling sleeve 60, to screw the threaded spindle 27 out of the actuator nut 31 to lengthen the push rod adjuster 16. The wrap spring freewheeling mechanism 29 is freewheeling here, i.e. the turns of the wrap spring 28 move, with the enlargement of the diameter of the helical spring 28, out of engagement with the active faces 54 and 55, with the result that the threaded spindle 27 can rotate freely in the wear adjustment direction. In contrast, rotation of the threaded spindle 27 in the opposing direction is prevented by the then blocking wrap spring freewheeling mechanism 29.

A control rod 32, whose rounded rear end bears in a bearing seat on the free end of the actuator lever 24, runs between the two cheeks 4 and 5 of the caliper lever 6. The control rod 32 is therefore coupled via a coupling point 33 to the activation lever 24, but in FIG. 2, the activation lever 24 is not shown. In its central region, the control rod 32 is bent over towards the outside of the brake caliper to avoid collisions with other components, in particular the brake force motor 14. The front, likewise rounded end of the control rod 32 rests in a bearing seat (not shown here) of a rotating lever 35, as is apparent from FIG. 2. The two-armed rotating lever 35 is rotatably mounted in its central region at a coupling point 36 and has a free limb 35a. The method of functioning of the rotating lever 35 in relation to adjoining components is explained in detail in EP 0 732 247 A2.

As is apparent from FIG. 2, the free end 35a of the rotating lever 35 is located opposite a lever part 45 at a distance s on the brake disk side to form an idle stroke device 44. The lever part 45 is embodied as a prolongation of the rotating arm 12. The distance s corresponds to the travel which, starting from a disk brake which is released with a correct releasing stroke, the end of the lever part 45 passes through when the two brake shoes 15 are applied to the brake disk 1 in a manner which is still free of brake application force. When there is bearing contact of the brake the lever part 45 just bears against the limb 35a of the rotating lever 35.

In the case of a brake bearing process, starting from an excessively large releasing stroke of the disk brake, for example due to wear of the brake shoe, the lever part 45 entrains the limb 35a with rotation of the rotating lever 35 from the point when the releasing excess stroke starts to be overcome, during the further movement of the lever part 45 until the point is reached where the brake bears, wherein the control rod 32 is displaced in the direction of the actuator lever 24, and in the process activates the push rod adjuster 16. The brake-disk-side, front end of the control rod 32 can therefore be coupled to the force outputting element 13 of the brake force motor 14 via a coupling point 46 which also includes the rotating lever 35.

In a modification of the described exemplary embodiment, the caliper levers can be coupled centrally to a pull rod adjuster 16 on the brake caliper, which pull rod adjuster can be activated in the shortening direction of the pull rod adjuster by an actuator lever 24. The wear adjuster 16 can be of any desired design, it must simply have an actuator lever, as already mentioned. The securing of the brake caliper to a spatially fixed part, ultimately a vehicle frame or bogie frame, can occur at another coupling point than the coupling point 10, and the design of a brake caliper unit with the brake housing can possibly be eliminated. The brake application of the brake caliper 7 can also take place in a different fashion, in one of the many known ways, for example by a brake cylinder which is coupled directly to the caliper levers 6, 8 or via a lever linkage.

The length of the push rod adjuster can therefore be set as a function of the stroke of the brake force motor by a control mechanism which acts with a control rod 32 on the actuator lever 24 of the push rod adjuster 16. As is apparent, in particular, from FIG. 3 to FIG. 8, the actuator lever 24 is mounted with a sleeve freewheeling mechanism 38 in the adjustor housing or bearing part 21 of the push rod adjuster 16, and in an adjustment-free home position it is loaded with the pin-like stop section 23 against a stop 37 of the bearing part 21 or a lid 21a of the bearing part 21 by the restoring spring 26. This situation is shown, in particular, in FIG. 4, in which the actuator lever 24 is in its spring-loaded home position.

The stop 37 for the actuator element 24 which is in its home position includes at least one element 39 which is elastic in the stop direction, preferably a compression spring. The compression spring 39 is prestressed, with its prestressing force being larger than the force of the restoring spring 26 which loads the actuator lever 24 against the stop 37. In the bearing part 21, or in the lid 21a thereof, the compression spring 39 is positioned in such a way that the actuator lever 24 comes to bear on it when it is rotated into its home position by the force of the restoring spring 26. Since the prestressing force of the prestressed compression spring 39 is greater than the force of the restoring spring 26, a defined home position of the actuator lever 24 is ensured.

Figure 4:
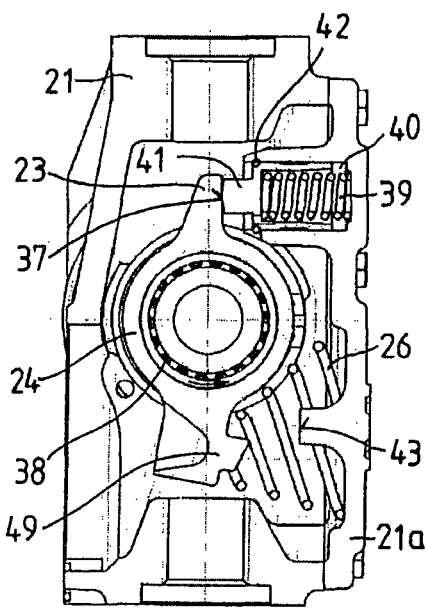
FIG. 4 shows a cross-sectional illustration along the line IV-IV in FIG. 3, which illustration shows an actuator element in its home position, the actuator element being mounted with a sleeve freewheeling mechanism in an adjustor housing.
Figure 6:
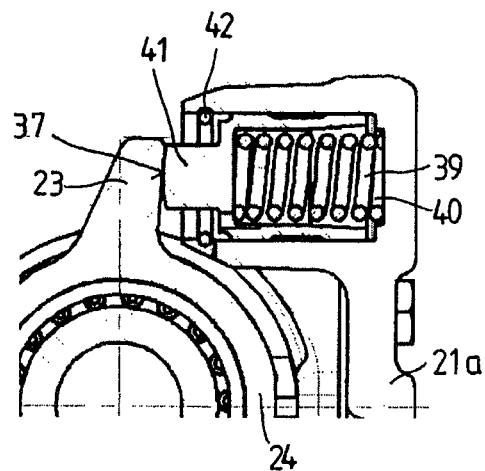
FIG. 6 shows an enlarged detail from FIG. 5.

In particular, the compression spring 39 is accommodated in a, for example, cylindrical recess 40 in the bearing part 21 or the lid 21a thereof in the push rod adjuster 16 and is supported there by both ends in a prestressed fashion, wherein the compression spring 39 makes contact with the actuator lever 24 via a pressure element 41 which is mounted in the recess 40 so as to be displaceable in the stop direction, as is shown best by FIG. 4 and FIG. 6. The pressure element 41 is prevented from exiting the recess 40 by a circlip 42, for example, which is inserted into a radially inner annular groove in the recess 40 in the lid 21a, and as a result the prestress of the compression spring 39 is generated. To be more precise, the pressure element 41 stresses the compression spring 39, which is under prestress, axially against a stop which is formed in the recess 40, which is formed by the circlip 42 here. On the basis of FIG. 4, it is easy to understand that owing to the lid 21a, the compression spring 39, the pressure element 41 and the restoring spring 26 are easy to mount.

The restoring spring 26, here preferably a conical spring, therefore holds the actuator lever 24 in its home position. The actuator lever 24 bears here against the pressure element 41 which is displaceably mounted in the bearing part 21 in the recess 40, configured for example as blind drilled hole, which actuator lever 24 can be pushed against the prestresed compression spring 39.

Figure 7:
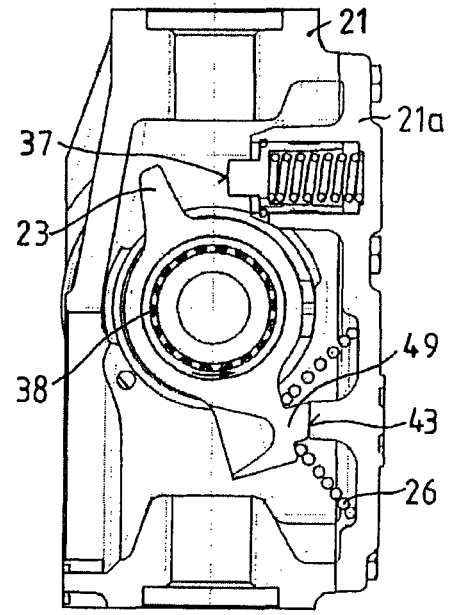
FIG. 7 shows the actuator element from FIG. 4 in a position which corresponds to a maximum adjustment travel of the push rod adjuster from FIG. 3.
Figure 5:
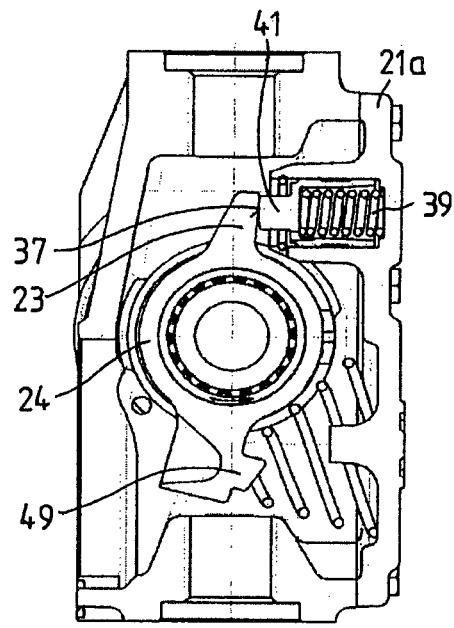
FIG. 5 shows the actuator element from FIG. 4 in a position in which it is loaded beyond the home position.

As is apparent from FIGS. 4, 5 and 7, in addition to the stop 37 which is assigned to the home position of the actuator lever 24 and with the compression spring 39, a further stop 43 is provided in the bearing part 21 or the lid 21a thereof, against which stop 43 the actuator lever 24 abuts, counter to the effect of the restoring spring 26, with a further pin-shaped stop section 49 when the push rod adjuster 16 adjusts by a maximum adjustment travel. This situation is shown in FIG. 7.

Given a large degree of elastic deformation of the wrap spring 28 of the wrap spring freewheeling mechanism 29, the compression spring 39 is overridden, as shown in FIG. 5 and FIG. 6. The torque acting on the actuator lever 24 and therefore on the sleeve freewheeling mechanism 38 is then limited to the torque or the force which is applied to the sleeve freewheeling mechanism 38 by the compression spring 39. When the compression spring 39 is deformed elastically as shown in FIG. 6, the pressure element 41 is then pushed by a certain amount into the recess or blind drilled hole 40 and lifts off from the circlip 42, which otherwise forms the axial stop for the pressure element 42 in the home position.

If the wrap spring freewheeling mechanism 29 therefore permits a certain amount of rotation of the tube nut 31, in the shortening direction because of elastic extension under load, the actuator lever 24 can follow this rotation counter to the force of the compression spring and the pressure element 41 is displaced linearly in the process (see FIG. 6). The sleeve freewheeling mechanism 38 is loaded here only with the torque which results from the spring force of the compression spring 39 and the distance between its line of action and the rotational axis of the actuator nut 31, which is coaxial to the longitudinal axis 25.

Figure 8:
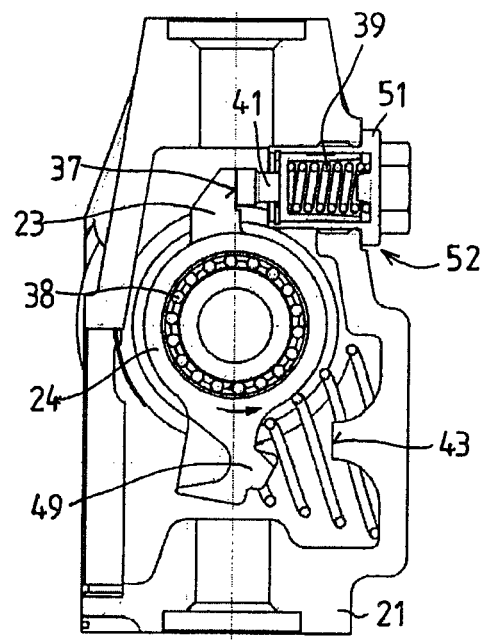
FIG. 8 shows a cross-sectional illustration of a further embodiment of a push rod adjuster.

According to a further embodiment, shown in FIG. 8, the compression spring 39 and the pressure element 41 are held in the interior of a hollow screw 51, which is screwed in from the outside into a through-drilled hole 52, formed as a threaded drilled hole, in the bearing part 21. Such an elastic stop 37 can then be easily retrofitted in a push rod adjuster 16 which is already present. Otherwise, the design and the method of functioning of the elastic stop 37 are as described in the preceding exemplary embodiment. Last but not least, the embodiment according to FIG. 8 eliminates the lids 21a in the embodiment according to FIG. 4 to FIG. 6.

According to a further exemplary embodiment (not illustrated here), the elastic element can, instead of being embodied as a compression spring 39, be embodied as any desired elastic element. In particular, an embodiment as a conical spring, or as an elastomer which is vulcanized to the adjustor housing or bearing part 21 or arranged or mounted separately is conceivable.

Last but not least, it is also conceivable to embody the elastic element as a section which is in one piece with the bearing part 21 and which has, owing to a particular geometric configuration, a higher degree of elasticity than the regions of the bearing part 21 which adjoin it. In this case, the high degree of resilience or elasticity therefore does not result from a lower degree of material rigidity but rather from rigidity of the stop 37 which is lower for geometric reasons, compared to the adjoining regions of the bearing part 21.

LIST OF REFERENCE NUMERALS

1 Brake disk
2 Brake housing
6 Caliper lever
7 Brake caliper
8 Caliper lever
9 Bolt
10 Coupling point
11 Bolt projection
12 Rotating arm
13 Force outputting element
14 Brake force motor
15 Brake shoe
16 Push rod adjuster
17 Coupling point
18 Coupling point
19 Coupling point
20 Coupling point
21 First wear adjuster housing
21a Lid
22 Second wear adjuster housing
23 Bearing section
24 Actuator lever
25 Longitudinal axis
26 Restoring spring
27 Threaded spindle
28 Wrap spring
29 Wrap spring freewheeling mechanism
31 Actuator nut
32 Control rod
33 Coupling point
35 Rotating lever
35a End
36 Coupling point
37 Stop
38 Sleeve freewheeling mechanism
39 Compression spring
40 Recess
41 Pressure element
42 Circlip
43 Stop
44 Idle stroke device
45 Lever part
46 Coupling point
49 Bearing section
51 Hollow screw
52 Through-drilled hole
53 Toothing
54 Active face
55 Active face
56 Folding bellows
57 Projection
58 End face
59 End face
60 Coupling sleeve
100 Disk brake

The invention claimed is:

1. A wear adjuster for a brake caliper of a disk brake of a rail vehicle, the wear adjuster comprising:
   a helical gearing, which has, as screw connection parts, a threaded spindle and a nut which can be screwed thereon, wherein one of the screw connection parts and an actuator element for rotatably driving the screw connection part in a wear adjustment direction are rotated in a first wear adjuster housing to provide a rotatable screw connection part, and the other screw connection part is mounted in a rotationally fixed fashion in a second wear adjuster housing to provide a fixed screw connection part; and
   a wrap spring freewheeling mechanism, which blocks, in the direction of rotation of the rotatable screw connection part counter to a wear adjustment, and freewheels, in the opposite direction of rotation so as to couple the rotatable screw connection part to a rotationally fixed part by the wrap spring freewheeling mechanism,
   wherein the rotationally fixed part is formed directly by the first wear adjuster housing such that the rotatable screw connection part is supported on the first wear adjuster housing directly by the wrap spring freewheeling mechanism.

2. The wear adjuster of claim 1, wherein a wrap spring of the wrap spring freewheeling mechanism interacts in a frictionally locking fashion with a radially outer active face, which forms an outer surface of the first wear adjuster housing, and also interacts with a radially outer active face of the rotatable screw connection part or an element which rotates along with the rotatable screw connection part.

3. The wear adjuster of claim 2, wherein the active face of the first wear adjuster housing and the active face of the rotatable screw connection part or that of the element which rotates along therewith are coupled by the wrap spring exclusively by frictionally locking engagement.

4. The wear adjuster of claim 1, wherein the rotatable screw connection part is the threaded spindle and the rotationally fixed screw connection part of the helical gearing is the nut.

5. The wear adjuster of claim 4, wherein the threaded spindle is coupled to a coupling sleeve as an element which rotates along, on the radially outer circumferential face of which threaded spindle an active face is formed for the wrap spring of the wrap spring freewheeling mechanism to engage on.

6. The wear adjuster of claim 5, wherein the coupling sleeve is rotatably mounted in the first wear adjuster housing coaxially with respect to the threaded spindle.

7. The wear adjuster of claim 1, wherein the rotatable screw connection part is the nut, and the rotationally fixed screw connection part is the threaded spindle.

8. The wear adjuster of claim 7, wherein the active face for the wrap spring of the wrap spring freewheeling mechanism to engage on is formed directly on a radial outer circumferential face of the nut.

9. The wear adjuster of claim 1, wherein the wrap spring of the wrap spring freewheeling mechanism is, when viewed in the radial direction, enclosed exclusively by a folding bellows, which is secured, at one end, to the first wear adjuster housing and, at the other end, to the second wear adjuster housing.

10. The wear adjuster of claim 1, wherein the rotatable screw connection part or an element which rotates along therewith has an end face which points in the axial direction and which makes contact with a corresponding end face of the first wear adjuster housing to support an axial force acting on the wear adjuster.

11. A disk brake further comprising a wear adjuster as claimed in claim 1.

\* \* \* \* \*